(12) United States Patent
Matsushita et al.

(10) Patent No.: US 12,115,844 B2
(45) Date of Patent: Oct. 15, 2024

(54) BACK DOOR STRUCTURE OF VEHICLE

(71) Applicant: Mazda Motor Corporation, Hiroshima (JP)

(72) Inventors: Masaki Matsushita, Aki-gun (JP); Kohei Fukumitsu, Aki-gun (JP); Atsushi Ito, Aki-gun (JP); Takayuki Sugishima, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 18/123,993

(22) Filed: Mar. 21, 2023

(65) Prior Publication Data

US 2023/0339299 A1 Oct. 26, 2023

(30) Foreign Application Priority Data

Apr. 25, 2022 (JP) ................................. 2022-071564

(51) Int. Cl.
*B60J 5/10* (2006.01)
(52) U.S. Cl.
CPC ..................... *B60J 5/107* (2013.01)
(58) Field of Classification Search
CPC ................. B60J 5/107; B60J 5/102
See application file for complete search history.

(56) References Cited

U.S. PATENT DOCUMENTS

| 7,618,083 | B2* | 11/2009 | Munenaga | B60J 5/101 |
| | | | | 296/146.8 |
| 2007/0170751 | A1* | 7/2007 | Tanaka | B60J 5/101 |
| | | | | 296/146.6 |
| 2014/0167446 | A1* | 6/2014 | Iwano | B60J 5/107 |
| | | | | 296/146.8 |
| 2018/0056763 | A1* | 3/2018 | Motohashi | B60J 5/107 |
| 2019/0168589 | A1* | 6/2019 | Aldersley | B60J 5/0469 |

FOREIGN PATENT DOCUMENTS

JP 2011-148464 A 8/2011

* cited by examiner

*Primary Examiner* — Marcus Menezes
(74) *Attorney, Agent, or Firm* — XSENSUS LLP

(57) ABSTRACT

A back door that reduces noise in a vehicle interior by suppressing vibration of an outer panel while reducing the weight and costs includes an outer panel and an inner panel. The inner panel includes a horizontal frame part, vertical frame parts, merging parts, and connecting parts. The connecting part extends only from one end part on an opening part side in a width direction of the horizontal frame part, the connecting part extends only from one end part on an opening part side in the width direction of the vertical frame part, and the connecting part extends only from one end part on an opening part side in the width direction of the vertical frame part. The connecting parts are respectively connected to the outer panel. The merging parts are formed with higher torsional rigidity than the horizontal frame part and the vertical frame parts.

16 Claims, 6 Drawing Sheets

BACK DOOR STRUCTURE OF VEHICLE

CROSS-REFERENCE TO RELATED APPLICATION

The present application claims priority to Japanese Patent Application No. 2022-071564 filed on Apr. 25, 2022, the entire contents of which are incorporated herein by reference.

BACKGROUND

Field

The present disclosure relates to a back door structure of a vehicle.

Description of the Related Art

In vehicles such as vans including a SUV (Sport Utility Vehicle), an opening part is provided on the rear of a vehicle body, and a back door for opening and closing the opening part is attached. The height and width of the back door increase with an increase in size of the vehicle.

Incidentally, suppression of vibration is required for the back door during traveling of the vehicle. This is because occurrence of vibration in the back door during traveling of the vehicle causes generation of noise in a vehicle interior. The structure for suppressing vibration of the back door during traveling is disclosed in Patent Document 1.

In a back door structure disclosed in Patent Document 1, the back door is formed by connecting an outer panel to an inner panel. The inner panel is provided with an opening part at a lower half part placed lower than a windshield opening part, and is provided with an intermediate side part, lower part side parts, and a lower side part so as to surround the periphery of the opening part. Then, three joining parts are extended from a lower side of the intermediate side part in the inner panel, and one joining part is extended from each of the right-and-left lower part side parts. These joining parts are connected to the outer panel. Moreover, a reinforcing member for reinforcing an opening part for a latch is mounted at the lower side part, and the inner panel and the outer panel are fixed also by the reinforcing member.

In Patent Document 1, the inner panel and the outer panel are connected by five joining parts and one reinforcing member to thereby suppress vibration of the back door during traveling of the vehicle.

PRIOR ART DOCUMENTS

Patent Documents

[Patent document 1] JP-A-2011-148464

SUMMARY

Problems to be Solved

The reduction in weight and in cost are required in vehicles, and the reduction in weight and in cost of the back door also has problems. As countermeasures for reducing the weight and reducing costs of the back door, it is considered that a frame part of the inner panel is reduced in width, that the above-described reinforcing member is removed, and the like.

However, as a result of study by inventors of the present application, it is found that, in the back door structure disclosed in the above Patent Document 1, there arises a problem that torsion occurs at the frame part of the inner panel around an axial center of the frame part extending in a longitudinal direction due to vibration inputted from the outer panel in the case where the frame part (the intermediate side part, the lower side part, and the like) of the inner panel is reduced in width and the reinforcing member is removed. When the above torsion occurs at the frame part of the inner panel, it is difficult to suppress film surface resonance of the outer panel, and so-called booming noise may occur in the vehicle interior.

It can be considered that the width of the frame part is widened and that the frame part is connected to the outer panel on both sides in a width direction to suppress the torsion at the frame part of the inner panel; however, these are contrary to the reduction in weight and in cost of the back door.

The present disclosure has been made for solving the above problems, and an object thereof is to provide a back door structure of a vehicle capable of reducing noise in the vehicle interior by suppressing vibration of the outer panel while reducing the weight and costs.

Solutions to the Problems

A back door structure of a vehicle according to an aspect of the present disclosure is a back door structure of a vehicle including a windshield opening part to which a windshield is fitted, which has an outer panel, an inner panel, and connecting parts. The outer panel is a panel forming an outer side of the vehicle in the back door. The inner panel is a panel for forming an inner side of the vehicle in the back door. The connecting parts connect the outer panel and the inner panel.

The inner panel according to the aspect includes a first opening part, a second opening part, a third opening part, a fourth opening part, a first vertical frame part, a second vertical frame part, a horizontal frame part, a first merging part, and a second merging part. The first opening part is an opening part provided above a lower end side of the inner panel in a lower portion than the windshield opening part. The second opening part is an opening part provided between the first opening part and the windshield opening part. The third opening part is an opening part provided between the first opening part/the second opening part and a right end side of the inner panel. The fourth opening part is an opening part provided between the first opening part/the second opening part and a left end side of the inner panel. The first vertical frame part is a frame part provided so as to extend between the first opening part/the second opening part and the third opening part in an up and down direction (vertical direction). The second vertical frame part is a frame part provided so as to extend between the first opening part/the second opening part and the fourth opening part in the up and down direction (vertical direction). The horizontal frame part is a frame part provided so as to extend between the first opening part and the second opening part in a right and left direction (horizontal direction). The first merging part is a part provided at a portion where the horizontal frame part and the first vertical frame part merge. The second merging part is a part provided at a portion where the horizontal frame part and the second vertical frame part merge.

In this aspect, the connecting parts connect at least one frame part among the horizontal frame part, the first vertical frame part, and the second vertical frame part to the outer panel, and connect only one end part in a width direction of at least one frame part to the outer panel. Then, each of the first merging part and the second merging part is formed to have higher torsional rigidity than the horizontal frame part, the first vertical frame part and the second vertical frame part.

In the back door structure of the vehicle according to the aspect, the connecting parts connecting at least one frame part to the outer panel connect only one end part in the width direction of at least one frame part to the outer panel; therefore, the formation number of the connecting parts can be reduced as compared with a structure in which both end parts in the width direction of each of the frame parts are connected to the outer panel, which can reduce the weight and costs.

When only one end part in the width direction of at least one frame part is connected to the outer panel as described above, torsion may occur at the frame part around an axial center extending in the longitudinal direction due to vibration inputted from the outer panel. However, in the back door structure of the vehicle according to the aspect, the first merging part and the second merging part are formed with higher torsional rigidity than the horizontal frame part, the first vertical frame part and the second vertical frame part; therefore, torsion of at least one frame part in the inner panel can be suppressed.

Accordingly, in the back door structure of the vehicle according to the aspect, torsion of at least one frame part is suppressed while reducing the weight and costs, thereby suppressing vibration of the outer panel and reducing noise in the vehicle interior.

In the back door structure of the vehicle according to the aspect, each of the first merging part and the second merging part may be formed so that a dimension in the up and down direction is larger than the horizontal frame part and so that a dimension in the right and left direction (vehicle width direction) is larger than each of the first vertical frame part and the second vertical frame part.

In the back door structure of the vehicle according to the aspect, each of the first merging part and the second merging part is formed so that the dimension in the up and down direction is larger than the horizontal frame part and so that dimension in the right and left direction is larger than each of the first vertical frame part and the second vertical frame part; therefore, a polar moment of inertia of area in each of the first merging part and the second merging part can be higher than in the horizontal frame part, the first vertical frame part and the second vertical frame part. Accordingly, the back door structure of the vehicle according to the aspect has an advantage in suppressing vibration of the outer panel and reducing noise in the vehicle interior by inhibiting torsion of at least one frame part while reducing the weight and costs.

In the back door structure of the vehicle according to the aspect, each of the first merging part and the second merging part may have an approximately triangular shape in front view.

The back door structure of the vehicle according to the aspect has an advantage in dispersing loads inputted from the outer panel through at least one frame part as each of the first merging part and the second merging part has the approximately triangular shape in planar view.

Note that the "approximately triangular shape" in the above description means that respective corners have an arc shape or a shape cut in straight lines.

In the back door structure of the vehicle according to the aspect, the connecting parts may include a first connecting part, a second connecting part, and a third connecting part. The first connecting part may be a connecting part connecting only one end part in the width direction of the horizontal frame part to the outer panel. The second connecting part may be a connecting part connecting only one end part in the width direction of the first vertical frame part to the outer panel. The third connecting part may be a connecting part connecting only one end part in the width direction of the second vertical frame part to the outer panel.

The connecting parts include the first connecting part, the second connecting part, and the third connecting part in the back door structure of the vehicle according to the aspect; therefore, film surface resonance of the outer panel can be effectively suppressed by the inner panel as compared with a case where the outer panel is connected to the inner panel by the connecting part at one place.

In the back door structure of the vehicle according to the aspect, the first connection part, the second connecting part, and the third connecting part may be provided at positions overlapping one another in a side view from the right and left direction.

The first connection part, the second connecting part, and the third connecting part are provided at positions overlapping with one another in side view from the right and left direction in the back door structure of the vehicle according to the aspect; therefore, the back door structure of the vehicle has an advantage in suppressing complication of a resonance mode of the outer panel and in suppressing the film surface resonance of the outer panel by the inner panel.

In the back door structure of the vehicle according to the aspect, the first connecting part may include a connecting wall part connecting between the outer panel and the inner panel in a front and rear direction, and the connecting wall part may have beads formed so as to extend in the front and rear direction.

The back door structure of the vehicle according to the aspect is provided with the beads on the connecting wall part in the first connecting part; therefore, high rigidity of the connecting wall part can be secured with respect to vibration inputted from the outer panel to the inner panel. Accordingly, the film surface resonance of the outer panel can be suppressed by the inner panel further effectively.

In the back door structure of the vehicle according to the aspect, the first connecting part may be integrally formed with the horizontal frame part, the second connecting part may be integrally formed with the first vertical frame part, and the third connecting part may be integrally formed with the second vertical frame part.

The first connecting part is integrally formed with the horizontal frame part, the second connecting part is integrally formed with the first vertical frame part, and the third connecting part is integrally formed with the second vertical frame part, respectively in the back door structure of the vehicle according to the aspect; therefore, the number of parts can be reduced. Furthermore, connection between the first connecting part and the horizontal frame part, connection between the second connecting part and the first vertical frame part, and connection between the third connecting part and the second vertical frame part are not necessary, which can reduce man-hours at the time of manufacturing. Accordingly, the back door structure of the vehicle according to the aspect further has an advantage in reducing the weight and costs.

In the back door structure of the vehicle according to the aspect, the first connecting part may connect only one end part on the first opening part's side in the width direction of the horizontal frame part to the outer panel, the second connecting part may connect only one end part on the third opening part's side in the width direction of the first vertical frame part to the outer panel, and the third connecting part may connect only one end part on the fourth opening part in the width direction of the second vertical frame part to the outer panel.

In the back door structure of the vehicle according to the aspect, the first connecting part is arranged on the first opening part's side in the width direction of the horizontal frame part, the second connecting part is provided on the third opening part's side in the width direction of the first vertical frame part, and the third connecting part is arranged on the fourth opening part's side in the width direction of the second vertical frame part; therefore, the position where the number plate is assumed to be fitted and peripheral areas thereof on the outer panel can be connected to the inner panel by the first connecting part, the second connecting part, and the third connecting part. Accordingly, the position where the number plate is assumed to be fitted in which the film surface resonance tends to occur in the outer panel is connected to the inner panel, thereby further exhibiting an advantage in suppressing the film surface resonance.

In the back door structure of the vehicle according to the aspect, when the first vertical frame part is separated into a first upper part and a first lower part by setting the first merging part as a boundary, the first upper part may be formed so that an angle made by the first upper part with an axis line extending along the up and down direction of the back door is larger than an angle made by the first lower part positioned at a lower part than the first merging part, and when the second vertical frame part is separated into a second upper part and a second lower part by setting the second merging part as a boundary, the second upper part may be formed so that an angle made by the second upper part with an axis line extending in the up and down direction of the back door is larger than an angle made by the second lower part positioned at a lower part than the second merging part.

The angle is set so that the first upper part of the first vertical frame part extends outward as going upward than the first lower part, and the angle is set so that the second upper part of the second vertical frame part extends outward as going upward than the second lower part in the back door structure of the vehicle according to the aspect; therefore, a large dimension in the vehicle width direction can be secured in each of the first merging part and the second merging part as compared with a case where each of the first vertical frame part and the second vertical frame part is formed so as to extend in a straight line. Accordingly, the back door structure of the vehicle according to the aspect has an advantage in securing high torsional rigidity in each of the first merging part and the second merging part, and further has an advantage in suppressing vibration of the outer panel and reducing noise in the vehicle interior by inhibiting torsion of at least one the frame part while reducing the weight and costs.

Advantages

It is possible to reduce noise in the vehicle interior by suppressing vibration of the outer panel while reducing the weight and costs in the back door structure of the vehicle according to the above respective aspects.

DETAILED DESCRIPTION

Hereinafter, the present disclosure will be explained with reference to the drawings. Note that embodiments explained below indicates the present disclosure as an example and the disclosure is not at all limited to the following embodiment except its essential structure.

Embodiment

1. Entire Structure of Back Door 1

The entire structure of a back door 1 of a vehicle according to the embodiment will be explained with reference to FIG. 1 and FIG. 2. In the specification, directions are indicated on the basis of the vehicle to which the back door 1 is mounted. Specifically, an upper direction of the vehicle is denoted as "UP", a lower direction of the vehicle is denoted as "LO", a left direction of the vehicle is denoted as "LH", and a right direction of the vehicle is denoted as "RH". The direction of the back door 1 is indicated on the basis of the back door 1 in a state where a rear opening of the vehicle is closed.

Figure 1:
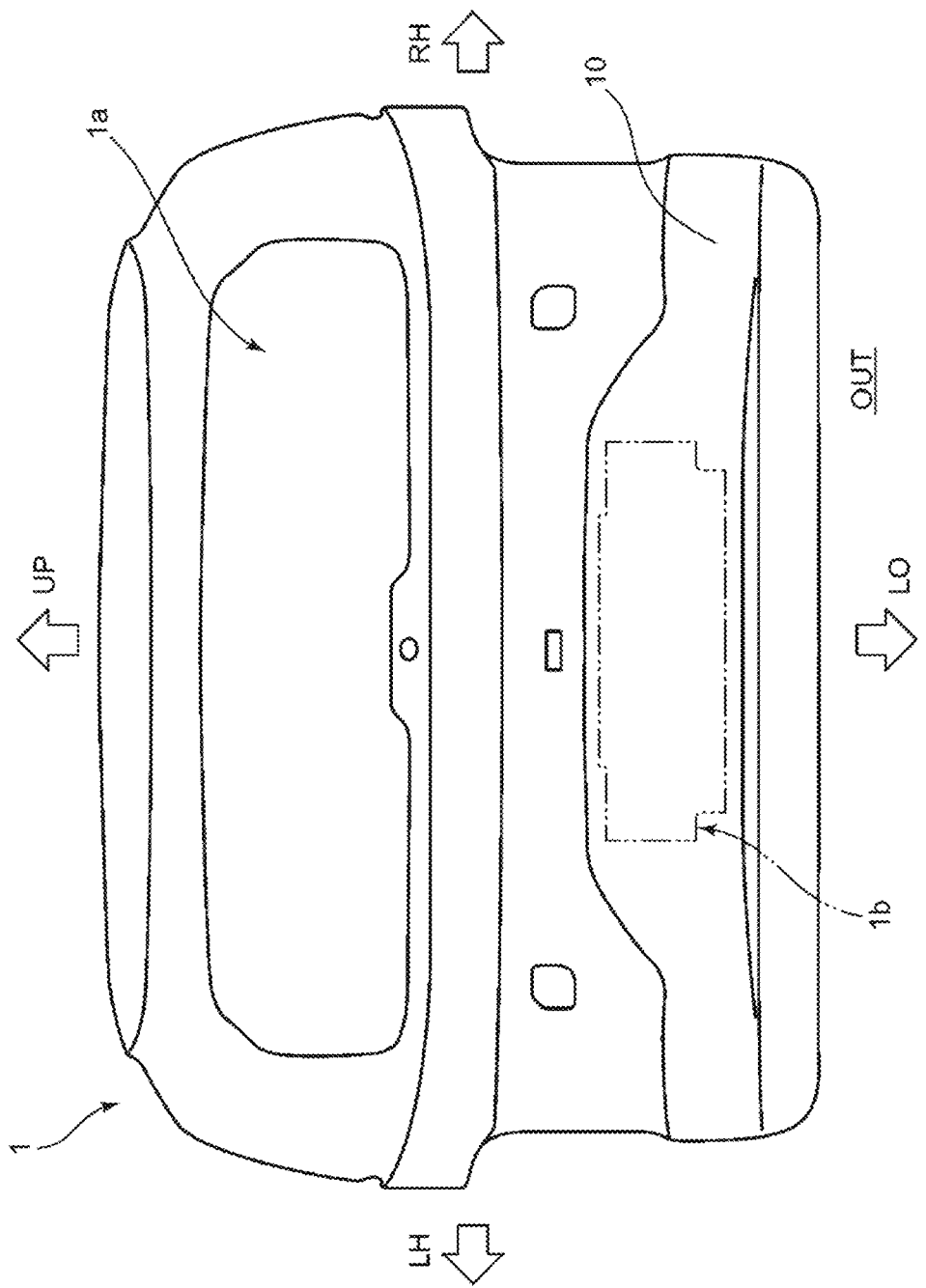
FIG. 1 is a rear view of a back door according to an embodiment, which is seen from a rear direction of a vehicle.
Figure 2:
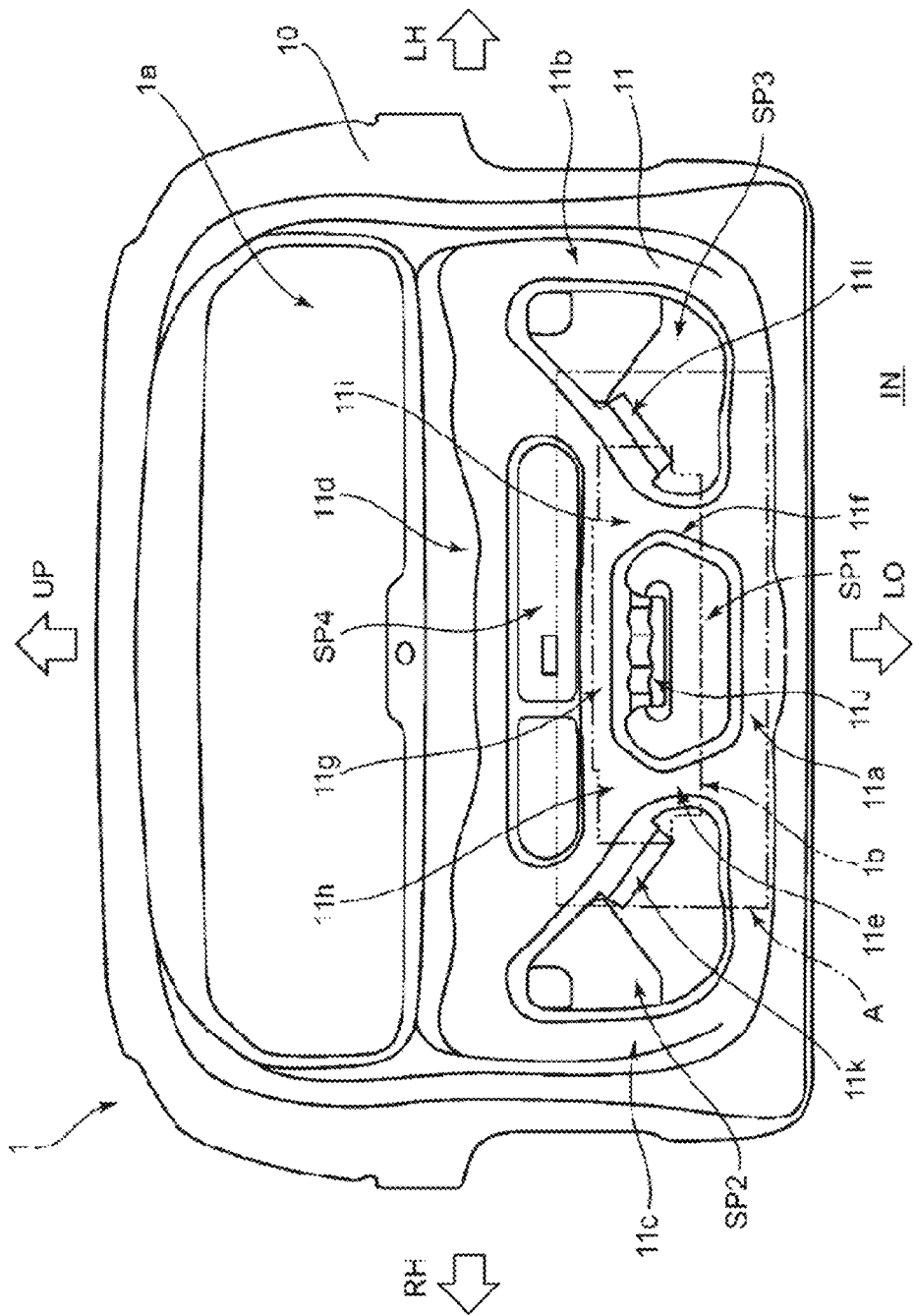
FIG. 2 is a front view of the back door seen from the front of the vehicle.

As shown in FIG. 1 and FIG. 2, the back door 1 has a windshield opening part 1*a* to which a windshield is fitted at an upper half part. The back door 1 includes an outer panel 10 and an inner panel 11. The outer panel 10 is a panel forming an outer side of the back door 1. The inner panel 11 is a panel forming an inner side than the outer panel 10 in the back door 1.

As shown in FIG. 2, the back door 1 has three connecting parts 11*j* to 111. The three connecting parts 11*j* to 111 are integrally formed with the inner panel 11 in the embodiment.

As shown in FIG. 1, an area where a number plate is assumed to be fitted (plate fitting area) 1*b* is provided at a lower part in a lower half of the back door 1. The plate fitting area 1*b* is prescribed in consideration of all destinations of vehicles to which the back door 1 is applied.

As shown in FIG. 2, four opening parts SP1 to SP4 are provided in the inner panel 11. The opening part (first opening part) SP1 is provided at the central portion in vehicle width direction (right and left direction) of the back door 1 so as to be apart upward from a lower end side of the inner panel 11. The opening part (second opening part) SP4 is provided between the opening part SP1 and the windshield opening part 1*a* in an up and down direction of the back door 1 so as to be apart respectively from the opening part SP1 and the windshield opening part 1*a*. A horizontal width (width in the right and left direction) of the opening part SP4 is set to be wider than the opening part SP1.

The opening part (third opening part) SP2 is provided between the opening part SP1/the opening part SP4 and a right end side of the inner panel 11 so as to be apart respectively from the opening parts SP1, SP4, and the right end side of the inner panel 11. The opening part SP2 has an approximately triangular shape with rounded corners in front view from the front direction of the vehicle. The opening (fourth opening part) SP3 is provided between the opening part SP1/the opening part SP4 and a left end side of the inner panel 11 so as to be apart respectively from the opening parts SP1, SP4, and the left end side of the inner panel 11. The opening part SP3 has an approximately triangular shape with rounded corners that is symmetrical to the opening part SP2 in front view seen from the front direction of the vehicle.

Moreover, as shown in FIG. 2, the inner panel 11 has outer peripheral frame parts 11a to 11d, vertical frame parts 11e, 11f and a horizontal frame part 11g. The lower outer peripheral frame part 11a among the outer peripheral frame parts 11a to 11d is a frame part extending between the opening parts SP1/SP2/SP3 and the lower end side of the inner panel 11 in the right and left direction. The side outer peripheral frame part 11b is a frame part extending between the opening part SP3 and the left end side of the inner panel 11 in the up and down direction. The lower outer peripheral frame part 11a and the side outer peripheral frame part 11b are connected at an abutting portion therebetween. The side outer peripheral frame part 11c is a frame part extending between the opening part SP2 and the right end side of the inner panel 11 in the up and down direction. The lower outer peripheral frame part 11a and the side outer peripheral frame part 11c are connected at an abutting portion therebetween. The upper outer peripheral frame part 11d is a frame part extending between the opening parts SP4/SP2/SP3 and the windshield opening part 1a in the right and left direction. The upper outer peripheral frame part 11d, the side outer peripheral frame part 11b, and the side outer peripheral frame part 11c are connected at abutting portions therebetween.

The vertical frame part (first vertical frame part) 11e is a frame part extending between the opening part SP1/the opening part SP4 and the opening part SP2 in the up and down direction. The vertical frame part 11e is connected to the lower outer peripheral frame part 11a at the lower end part, and is connected to both of the upper outer peripheral frame part 11d and the side outer peripheral frame part 11c at the upper end part. The vertical frame part (second vertical frame part) 11f is a frame part extending between the opening part SP1/the opening part SP4 and the opening part SP3 in the up and down direction. The vertical frame part 11f is connected to the lower outer peripheral frame part 11a at the lower end part and is connected to both of the upper outer peripheral frame part 11d and the side outer peripheral frame part 11b at the upper end part.

The horizontal frame part 11g is a frame part extending between the opening part SP1 and the opening part SP4 in the right and left direction. The vertical frame part 11e and the vertical frame part 11f are respectively connected to the horizontal frame part 11g at abutting portions.

The central connecting part 11j among the three connecting parts 11j to 11l is extended only from one end part on the opening part SP1 side in the width direction of the horizontal frame part 11g, extending toward the outer panel 10 arranged on the rear side of the vehicle (toward the back side of the paper in FIG. 2) and being connected to the outer panel 10 at the end part. The side connecting part 11k is extended only from one end part on the opening part SP2 side in the width direction of the vertical frame part 11e, extending toward the outer panel 10 arranged on the rear side of the vehicle (toward the back side of the paper in FIG. 2) and being connected to the outer panel 10 at the end part. The side connecting part 11l is extended only from one end part on the opening part SP3 side in the width direction of the vertical frame part 11f, extending toward the outer panel 10 arranged on the rear side of the vehicle (toward the back side of the paper in FIG. 2) and being connected to the outer panel 10 at the end part.

When the plate fitting area 1b in the back door 1 is displayed in FIG. 2, the connecting parts 11j to 11l are provided so as to overlap one another in an area containing the plate fitting area 1b in side view from the right and left direction in the up and down direction of the back door 1.

As shown in FIG. 2, the inner panel 11 includes two merging parts 11h, 11i. The merging part (first merging part) 11h is provided at a portion where a right end part of the horizontal frame part 11g merges with an intermediate portion in a longitudinal direction of the vertical frame part 11e, which is connected to the horizontal frame part 11g and the vertical frame part 11e, respectively. The merging part (second merging part) 11i is provided at a portion where a left end part of the horizontal frame part 11g merges with an intermediate portion in the longitudinal direction of the vertical frame part 11f, which is connected to the horizontal frame part 11g and the vertical frame part 11f, respectively.

Note that the merging part 11h and the merging part 11i are formed in symmetrical shapes in the embodiment.

2. Detailed Structure of Merging Parts 11h, 11i in Inner Panel 11 and Peripheral Area Thereof The detailed structure of the merging parts 11h, 11i in the inner panel 11 and a peripheral area thereof will be explained with reference to FIG. 3.

Figure 3:
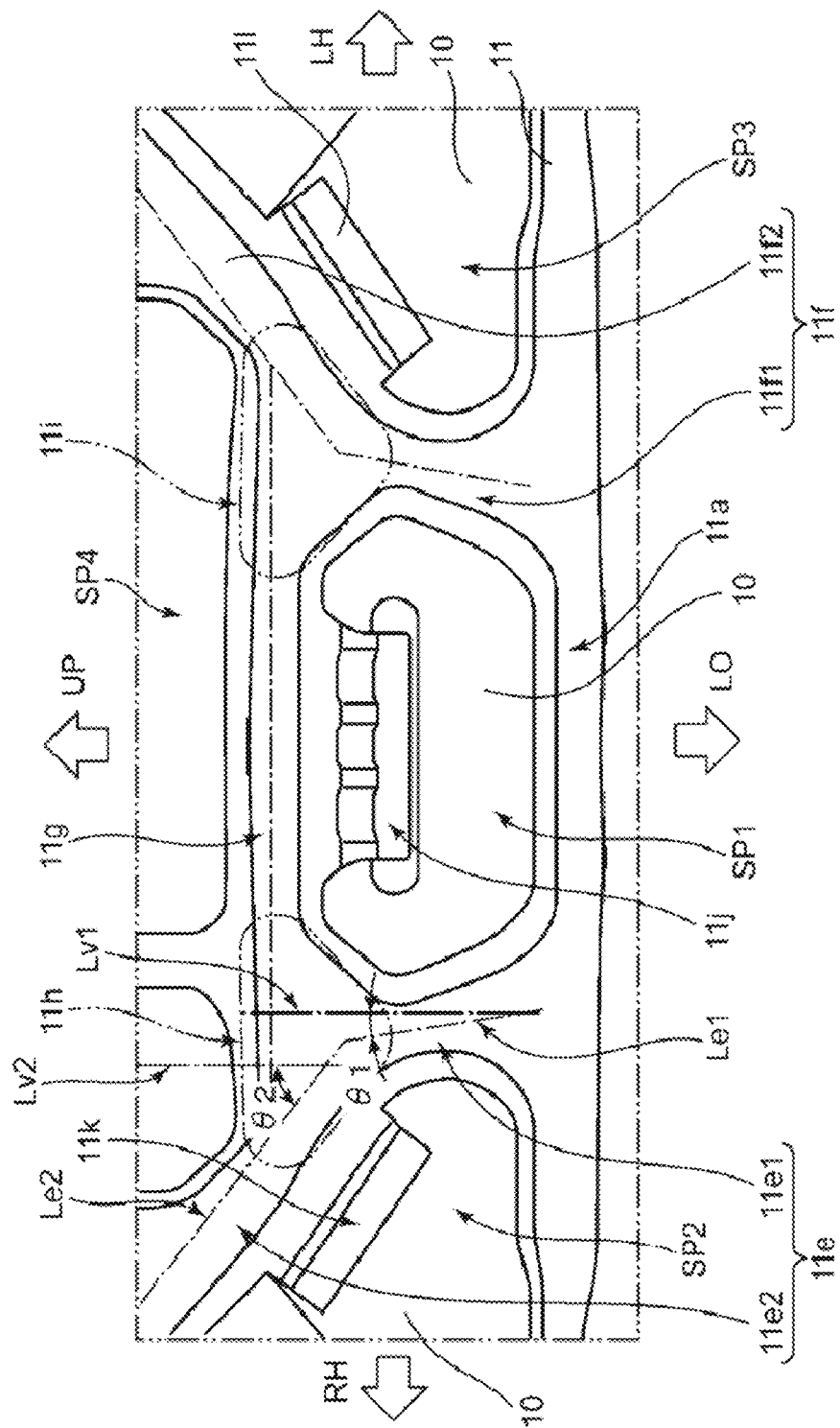
FIG. 3 is an enlarged view showing a A-part of FIG. 2 in an enlarged manner.

As shown in FIG. 3, the vertical frame part 11e is provided so as to be vertically inserted through the merging part 11h, and the vertical frame part 11f is provided so as to be vertically inserted through the merging part 11i. In the embodiment, the vertical frame part 11e is provided so that extending angles of a lower part (first lower part) 11e1 which is a lower part than the merging part 11h and an upper part (first upper part) 11e2 which is an upper part than the merging part 11h differ from each other. Specifically, when a center line of the lower part 11e1 is Le1, and a center line of the upper part 11e2 is Le2, angles $\theta 1$, $\theta 2$ made by the center lines and reference lines Lv1, Lv2 extending along the up and down direction of the back door 1 are set so as to satisfy the following relation.

$$\theta 2 > \theta 1 \quad \text{(formula 1)}$$

The vertical frame part 11f on the left side is also provided so that extending angles of a lower part (second lower part) 11f1 positioned at a lower part than the merging part 11i and an upper part (second upper part) 11f2 positioned at an upper part than the merging part 11i differ from each other. Moreover, the vertical frame part 11e and the vertical frame part 11f are formed in a symmetrical relation.

The merging part 11h is provided at an area surrounded by the opening part SP1, the opening part SP2, and the opening part SP4, and the merging part 11i is provided at an area surrounded by the opening part SP1, the opening part SP3, and the opening part SP4. Accordingly, each of the merging parts 11h, 11i has an approximately triangular shape in which a width in the right and left direction gradually increases as going from the lower part to the upper part.

Although each of the merging part 11*h* and the merging part 11*i* is shown as the triangular shape with rounded corners in FIG. 3, it is possible to prescribe each merging part as a triangular shape (e.g., a hexagonal shape) with respective corners cut in straight lines.

As shown in FIG. 3, the horizontal frame part 11*g*, the upper part 11*e*2 of the vertical frame part 11*e*, and the upper part 11*f*2 of the vertical frame part 11*f* are connected to one another in the merging parts 11*h*, 11*i*. Therefore, when these frame parts (the horizontal frame part 11*g*, the upper part 11*e*2 of the vertical frame part 11*e*, and the upper part 11*f*2 of the vertical frame part 11*f*) are seen as a whole, these parts can be regarded as one frame part extending in the right and left direction. Then, an extending portion of the central connecting part 11*j* with respect to the horizontal frame part 11*g*, an extending portion of the side connecting part 11*k* with respect to the upper part 11*e*2 of the vertical frame part 11*e*, and an extending portion of the side connecting part 11*l* with respect to the upper part 11*f*2 of the vertical frame part 11*f* are aligned at one end parts in a vertical width direction of respective frame parts (the horizontal frame part 11*g*, the upper part 11*e*2 of the vertical frame part 11*e*, and the upper part 11*f*2 of the vertical frame part 11*f*) in the embodiment. That is, the central connecting part 11*j* connects a lower end part in the vertical width direction of the horizontal frame part 11*g* to the outer panel 10, the side connecting part 11*k* connects a lower end part in the vertical width direction of the upper part 11*e*2 of the vertical frame part 11*e* to the outer panel 10, and the side connecting part 11*l* connects a lower end part in the vertical width direction of the upper part 11*f*2 of the vertical frame part 11*f* to the outer panel 10.

3. Structure of Central Connecting Part 11*j*

The structure of the central connection part 11*j* extended from one end part of the horizontal frame part 11*g* will be explained with reference to FIG. 4.

Figure 4:
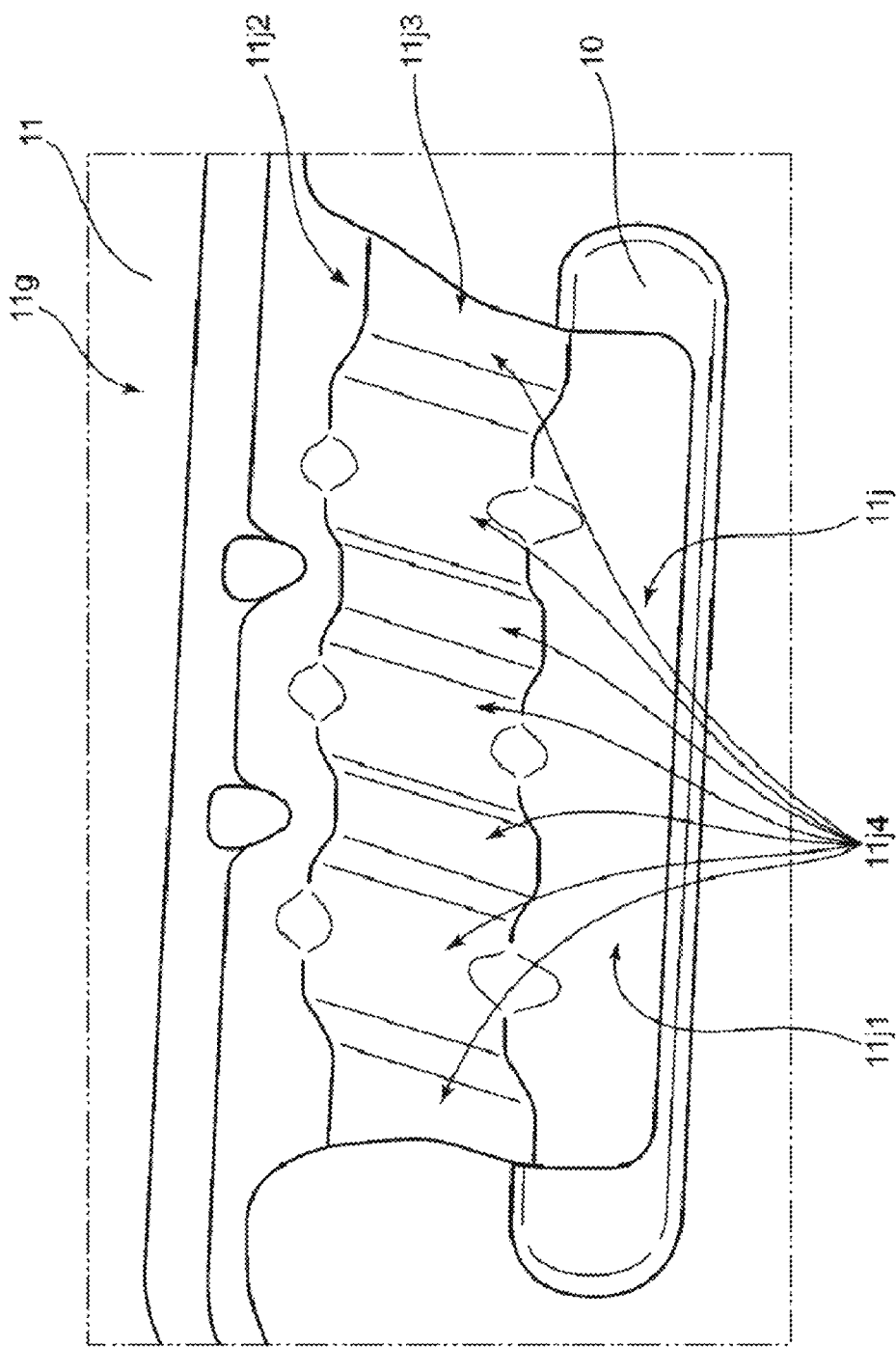
FIG. 4 is a perspective view showing a structure of a central connecting part.

As shown in FIG. 4, an outer joining part 11*j*1, an inner bending part 11*j*2, and a standing wall part 11*j*3 are continuously formed in the central connecting part 11*j*. The outer joining part 11*j*1 is a part joined to the outer panel 10. Joining between the outer joining part 11*j*1 and the outer panel 10 is made, for example, by spot welding or by using an adhesive.

The inner bending part 11*j*2 is a part having an L-shape in cross section extending from one end part in the width direction of the horizontal frame part 11*g* and bent toward the outer panel 10. The standing wall part 11*j*3 is a wall part connecting between the outer joining part 11*j*1 and the inner bending part 11*j*2, which is formed so as to extend in a front and rear direction of the vehicle and in the vehicle width direction.

As shown in FIG. 4, a plurality of beads 11*j*4 are formed on the standing wall part 11*j*3 of the central connecting part 11*j*. The plurality of beads 11*j*4 are formed so as to respectively extend in the front and rear direction and so as to be aligned in the right and left direction (vehicle width direction).

4. Supplement to Merging Parts 11*h*, 11*i* on Inner Panel 11

Figure 5:
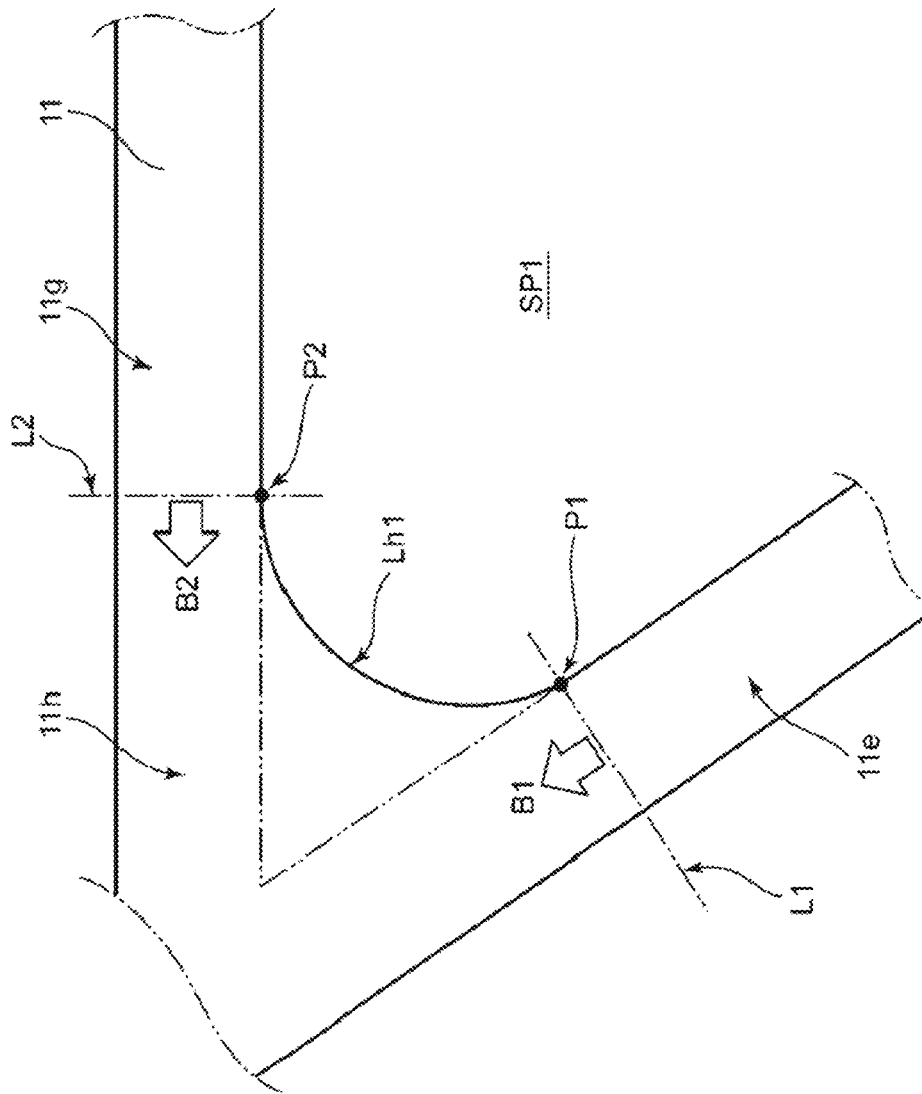
FIG. 5 is a schematic view for explaining positional relationship of a horizontal frame part, a vertical frame part, and a merging part.

Supplementary explanation of the merging parts 11*h*, 11*i* on the inner panel 11 according to the embodiment will be made with reference to FIG. 5. FIG. 5 is a schematic view schematically showing the merging part 11*h* and a peripheral area thereof. Explanation for the merging part 11*i* is omitted in the following explanation, but the explanation is the same as that for the merging part 11*h*.

As shown in FIG. 5, the merging part 11*h* that is a portion where the horizontal frame part 11*g* and the vertical frame part 11*e* merge has an arc edge part Lh1 curved in an arc shape on the opening part SP1 side. The arc edge part Lh1 is formed in the arc shape having the center on the opening part SP1 side in FIG. 5, but it is not always necessary to be formed in the arc shape.

A contact point between an end part on the opening part SP1 side in the width direction of the vertical frame part 11*e* and the arc edge part Lh1 is set to P1, and a contact point between an end part on the opening part SP1 side in the width direction of the horizontal frame part 11*g* and the arc edge part Lh1 is set to P2. Then, a virtual line L1 extending from the contact point P1 in the width direction of the vertical frame part 11*e* is drawn, and a virtual line L2 extending from the contact point P2 in the width direction of the horizontal frame part 11*g* is drawn. In this case, a portion upper than the virtual line L1 (portion denoted by an arrow B1) that is a portion on the right direction of the virtual line L2 (portion denoted by an arrow B2) is prescribed as the merging part 11*h*.

Though boundaries with respect to the merging parts 11*h*, 11*i* at the upper parts 11*e*2, 11*f*2 in the vertical frame parts 11*e*, 11*f* are not prescribed in the above explanation, the boundaries can be prescribed in the same manner as shown by the arrows B1, B2 in FIG. 5.

5. Advantages

In the back door 1 of the vehicle according to the embodiment, the connecting parts 11*j* to 11*l* connecting the respective frame parts 11*e* to 11*g* of the inner panel 11 to the outer panel 10 connect only one end part in the width direction of each of the frame parts 11*e* to 11*g* and the outer panel 10; therefore, the formation number of the connecting parts 11*j* to 11*l* can be reduced as compared with a structure in which both end parts in the width direction of each of the frame parts 11*e* to 11*g* are connected to the outer panel 10, which can reduce the weight and costs.

Moreover, only one end part in the width direction of each of the frame parts 11*e* to 11*g* is connected to the outer panel 10 in the back door 1 of the vehicle according to the embodiment; therefore, torsion may occur in the respective frame parts 11*e* to 11*g* around axial centers extending in the longitudinal direction due to vibration inputted from the outer panel 10. However, the inner panel 11 according to the embodiment has the merging parts 11*h*, 11*i*, and the merging parts 11*h*, 11*i* are formed with higher torsional rigidity than the horizontal frame part 11*g*, the vertical frame parts 11*e* and 11*f*; therefore, torsion can be suppressed in the respective frame parts 11*e* to 11*g* in the inner panel 11.

Accordingly, in the back door 1 of the vehicle according to the embodiment, torsion in the respective frame parts 11*e* to 11*g* can be suppressed while reducing the weight and costs, thereby suppressing vibration of the outer panel 10 and reducing noise in a vehicle interior.

Moreover, in the back door 1 of the vehicle according to the embodiment, each of the merging parts 11*h*, 11*i* is formed so that a dimension in the up and down direction is larger than the horizontal frame part 11*g*, and so that a dimension in the right and left direction (dimension in the vehicle width direction) is larger than each of the vertical frame parts 11*e*, 11*f*; therefore, polar moment of inertia of area in each of the merging parts 11*h*, 11*i* can be higher than in the horizontal frame part 11*g*, the vertical frame parts 11*e* and 11*f*. Accordingly, the back door 1 of the vehicle according to the embodiment has an advantage in suppressing vibration of the outer panel 10 and reducing noise in the vehicle interior by inhibiting torsion in the frame parts 11*e* to 11*g* while reducing the weight and costs.

Moreover, each of the merging parts 11*h*, 11*i* has the approximately triangular shape (triangular shape with rounded corners) in planar view in the back door 1 of the vehicle according to the embodiment; therefore, inputted from the outer panel 10 through the respective frame parts 11*e* to 11*g* can be effectively dispersed by the merging parts 11*h*, 11*i*.

Moreover, the back door 1 of the vehicle according to the embodiment includes the central connecting part 11*j* and the two side connecting parts 11*k*, 11*l* as the connecting parts 11*j* to 11*l*; therefore, film surface resonance of the outer panel 10 can be effectively suppressed by the inner panel 11 as compared with a case where the outer panel 10 is connected to the inner panel 11 by the connecting part at one place.

Moreover, the central connecting part 11*j* and the two side connecting parts 11*k*, 11*l* are provided at positions overlapping with one another in the up and down direction in the back door 1 of the vehicle according to the embodiment; therefore, a resonance mode of the outer panel 10 is not complicated and the film surface resonance of the outer panel 10 can be effectively suppressed by the inner panel 11.

Moreover, the back door 1 of the vehicle according to the embodiment is provided with the beads 11*j*4 on the standing wall part (connecting wall part) 11*j*3 in the central connecting part 11*j*; therefore, high rigidity of the standing wall part 11*j*3 can be secured with respect to vibration inputted from the outer panel 10 to the inner panel 11. Accordingly, the film surface resonance of the outer panel 10 can be effectively suppressed by the inner panel 11.

Moreover, the central connecting part 11*j* is integrally formed with the horizontal frame part 11*g*, the side connecting part 11*k* is integrally formed with the vertical frame part 11*e*, and the side connecting part 11*l* is integrally formed with the vertical frame part 11*f*, respectively in the back door 1 of the vehicle according to the embodiment; therefore, the number of parts can be reduced. Furthermore, connection between the central connecting part 11*j* and the horizontal frame part 11*g*, connection between the side connecting part 11*k* and the vertical frame part 11*e*, and connection between the side connecting part 11*l* and the vertical frame part 11*f* are not necessary, which can reduce man-hours at the time of manufacturing. Accordingly, the back door 1 of the vehicle according to the embodiment further has an advantage in reducing the weight and costs.

Furthermore, in the back door 1 of the vehicle according to the embodiment, the central connecting part 11*j* is arranged at one end part on the opening part SP1 side in the width direction of the horizontal frame part 11*g*, the side connecting part 11*k* is provided at one end part on the opening part SP2 side in the width direction of the vertical frame part 11*e*, and the side connecting part 11*l* is arranged at one end part on the opening part SP3 side in the width direction of the vertical frame part 11*f*; therefore, the plate fitting area (position where the number plate is assumed to be fitted) 1*b* and peripheral areas thereof in the back door 1 can be connected to the inner panel 11 by the connecting parts 11*j* to 11*l*. Accordingly, the plate fitting area 1*b* where the film surface resonance tends to occur in the outer panel 10 is connected to the inner panel 11, thereby further exhibiting an advantage in suppressing the film surface resonance.

Furthermore, the angle θ2 is set so that the upper part 11*e*2 of the vertical frame part 11*e* extends outward as going upward than the lower part 11*e*1, and the angle is also set so that the upper part 11*f*2 of the vertical frame part 11*f* extends outward as going upward than the lower part 11*f*1 in the same manner in the back door 1 of the vehicle according to the embodiment; therefore, a large dimension in the right and left direction (vehicle width direction) can be secured in each of the merging parts 11*h*, 11*i* as compared with a case where each of the vertical frame parts 11*e*, 11*f* is formed so as to extend in a straight line. Accordingly, the back door 1 of the vehicle according to the embodiment has an advantage in securing high torsional rigidity in each of the merging parts 11*h*, 11*i*, and further has an advantage in suppressing vibration of the outer panel 10 and reducing noise in the vehicle interior by inhibiting torsion of the frame parts 11*e* to 11*g* while reducing the weight and costs.

As described above, it is possible to reduce noise in the vehicle interior by suppressing vibration of the outer panel 10 while reducing the weight and costs in the back door 1 of the vehicle according to the embodiment.

MODIFICATION EXAMPLES

Figure 6:
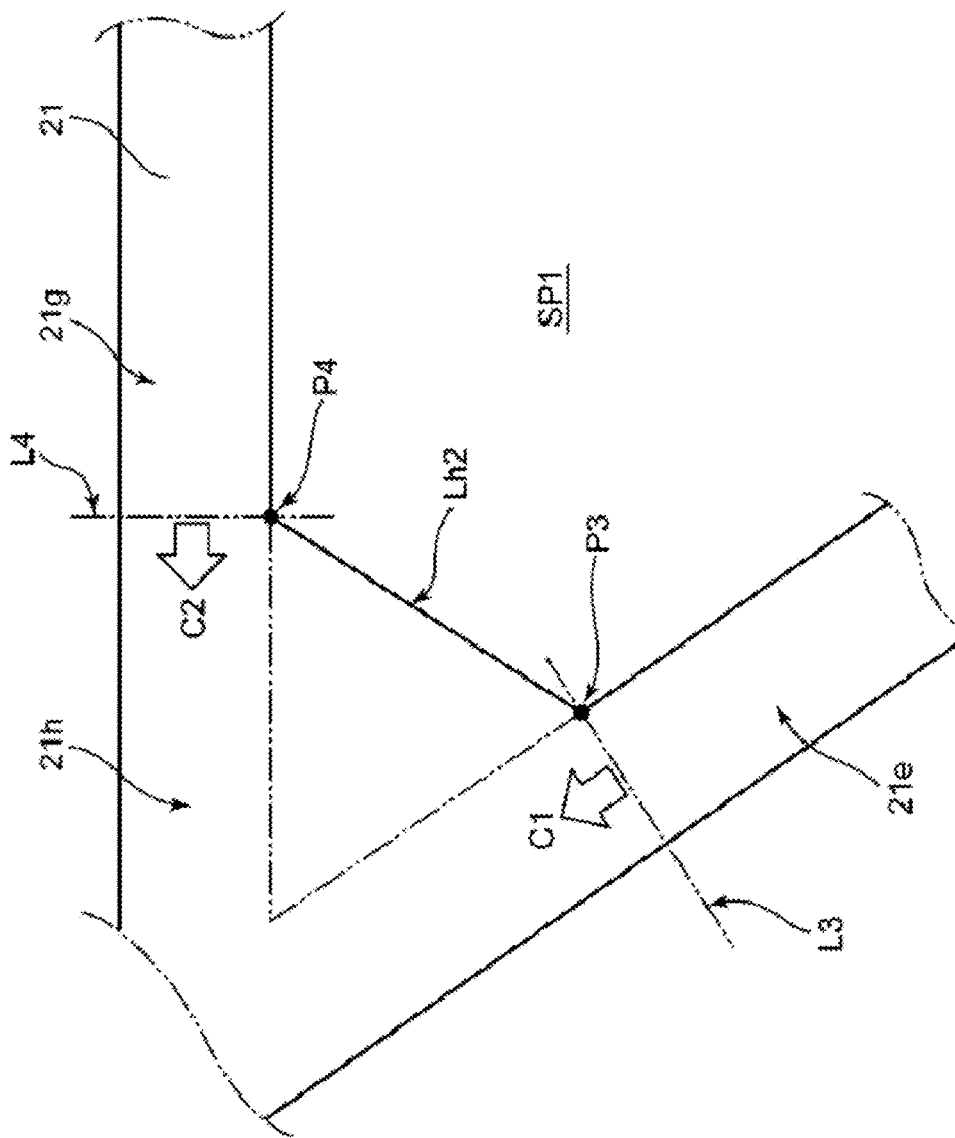
FIG. 6 is a schematic view for explaining positional relationship of the horizontal frame part, the vertical frame part, and the merging part in a back door according to a modification example.

A structure of an inner panel 21 according to a modification example will be explained with reference to FIG. 6. In FIG. 6, only part of a merging part 21*h* and a peripheral structure thereof in the structure of the inner panel 21 are schematically shown, and other structures of the back door 1 including the outer panel 10 and the like are the same as those of the above embodiment. Though two merging parts are symmetrically provided also in the modification example, one merging part 21*h* is shown in FIG. 6.

As shown in FIG. 6, the merging part 21*h* where a horizontal frame part 21*g* and a vertical frame part 21*e* merge on the inner panel 21 of the back door 1 of the vehicle according to the modification example has a straight edge part Lh2 having a straight-line shape on the opening part SP1 side. The straight edge part Lh2 is shown as an edge part formed by one straight line in FIG. 6; however, it is possible to form the edge part into a shape in which a plurality of straight lines are combined.

A contact point between an end part on the opening part SP1 side in the width direction of the vertical frame part 21*e* side and the straight edge part Lh2 is set to P3, and a contact point between an end part on the opening part SP1 side in the width direction of the horizontal frame part 21*g* and the straight edge part Lh2 is set to P4. Then, a virtual line L3 extending from the contact point P3 in the width direction of the vertical frame part 21*e* is drawn, and a virtual line L4 extending from the contact point P4 in the width direction of the horizontal frame part 21*g* is drawn. In this case, a portion upper than the virtual line L3 (portion denoted by an arrow C1) that is a portion on the right direction of the virtual line L4 (portion denoted by an arrow C2) is prescribed as the merging part 21*h*.

The same structure as the above embodiment can be adopted in the modification example except that the merging part 21*h* has the straight edge part Lh2; therefore, the same advantages as the above embodiment can be obtained.

Other Modification Examples

The merging parts 11*h*, 11*i* have the approximately triangular shape in front view from the front direction of the vehicle in the above embodiment; however, the present disclosure is not limited to this. For example, structures having polygonal shapes such as a quadrangle shape and a hexagonal shape, and structures having a circular shape, an elliptical shape and the like may be adopted.

The inner panel 11 has the three connecting parts 11j to 11l in the above embodiment; however, at least one connecting part can be provided in the present disclosure.

The structure in which the three connecting parts 11j to 11l are provided so as to overlap with one another in side view from the right and left direction in the up and down direction of the back door 1 is adopted in the above embodiment; however, it is not always necessary that the plural connecting parts are provided so as to overlap one another in the present disclosure.

The structure in which the beads 11j4 are formed on the standing wall part 11j3 of the central connecting part 11j is adopted in the above embodiment; however, a structure in which beads are formed on standing wall parts of all connecting parts can be adopted and a structure in which any bead is not formed on each of standing wall parts of all connecting parts can be also adopted.

The structure in which the connecting parts 11j to 11l are integrally formed with the frame parts 11e to 11g of the inner panel 11 is adopted in the embodiment; however, connecting parts separated from the inner panel can be adopted in the present disclosure.

Moreover, the structure in which the central connecting part 11j extends to the opening part SP1 side, the side connecting part 11k extends to the opening part SP2 side, and the side connecting part 11l extends to the opening part SP3 side is adopted in the above embodiment; however, the present disclosure is not limited to this. For example, a structure in which the central connecting part and the side connecting parts respectively extend to the opening part SP4 side can be adopted.

The structure in which extending directions of the respective vertical frame parts 11e, 11f differ between the upper parts 11e2, 11f2 and the lower parts 11e1, 11f1 when setting the merging parts 11h, 11i as boundaries is adopted in the above embodiment; however, a structure in which each of the vertical frame parts extends in a straight line from the upper part to the lower part may be adopted.

A structure in which the inner panel 11 includes four opening parts SP1 to SP4 is adopted in the embodiment; however, a structure in which the inner panel 11 includes five or more opening parts can be adopted.

The merging parts 11h, 11i are formed so that each area in planar view becomes large to thereby increase torsional rigidity of the merging parts 11h, 11i on the inner panel 11 to be higher than the vertical frame parts 11e, 11f, and the horizontal frame part 11g; however, the present disclosure is not limited to this. For example, the merging parts may be formed so that the material thickness becomes higher than the vertical frame parts and the horizontal frame part, or reinforcing members may be provided only at the merging parts. It is also possible to adopt beads or a recessed and projected structure for reinforcement only at the merging parts.

The structure in which the inner panel 11 includes the outer peripheral frame parts 11a to 11d is adopted in the above embodiment; however, it is not always necessary that the inner panel includes the outer peripheral frame parts.

Moreover, the structure in which the central connecting part 11j connects the lower end part in the vertical width direction of the horizontal frame part 11g to the outer panel 10, the side connecting part 11k connects the lower end part in the vertical width direction of the upper part 11e2 of the vertical frame part 11e to the outer panel 10, and the side connecting part 11l connects the lower end part in the vertical width direction of the upper part 11f2 of the vertical frame part 11f to the outer panel 10 is adopted in the above embodiment; however, the present disclosure is not limited to this. Contrary to the above, for example, a structure in which one end part on the upper side in the vertical width direction of the horizontal frame part is connected to the outer panel by the central connecting part, and one end parts on the upper side in the vertical width direction of upper parts of the respective vertical frame parts are connected to the outer panel by the side connecting parts on the right and left both sides can be adopted. The same advantages as the above embodiment can be obtained also in the case where respective connecting parts are arranged in this manner.

The invention claimed is:

1. A back door structure of a vehicle that includes a windshield opening part to which a windshield is fitted, comprising:
   an outer panel forming an outer side of the vehicle in a back door;
   an inner panel forming an inner side of the vehicle in the back door; and
   connecting parts connecting the outer panel and the inner panel,
   wherein the inner panel includes a first opening part provided above a lower end side of the inner panel in a lower portion than the windshield opening part, a second opening part provided between the first opening part and the windshield opening part, a third opening part provided between the first and second opening parts and a right end side of the inner panel, a fourth opening part provided between the first and second opening parts and a left end side of the inner panel, a first vertical frame part provided so as to extend between the first and second opening parts and the third opening part in an up and down direction, a second vertical frame part provided so as to extend between the first and second opening parts and the fourth opening part in the up and down direction, a horizontal frame part provided so as to extend between the first opening part and the second opening part in a right and left direction, a first merging part provided at a portion where the horizontal frame part and the first vertical frame part merge, and a second merging part provided at a portion where the horizontal frame part and the second vertical frame part merge,
   wherein the connecting parts overlap with the first merging part and second merging part, and
   wherein the connecting parts connect respective frame parts among the horizontal frame part, the first vertical frame part, and the second vertical frame part to the outer panel, and connect only one end part in a width direction of each of the respective frame parts to the outer panel, and each of the first merging part and the second merging part is formed to have higher torsional rigidity than the horizontal frame part, the first vertical frame part and the second vertical frame part.

2. The back door structure of the vehicle according to claim 1,
   wherein each of the first merging part and the second merging part is formed so that a height in the up and down direction is larger than a width of the horizontal frame part and so that a width in the right and left direction is larger than a height and width of each of the first vertical frame part and the second vertical frame part, respectively.

3. The back door structure of the vehicle according to claim 2,
wherein each of the first merging part and the second merging part has an approximately triangular shape in front view.

4. The back door structure of the vehicle according to claim 2,
wherein the connecting parts include a first connecting part connecting only one end part in the width direction of the horizontal frame part to the outer panel, a second connecting part connecting only one end part in the width direction of the first vertical frame part to the outer panel, and a third connecting part connecting only one end part in the width direction of the second vertical frame part to the outer panel.

5. The back door structure of the vehicle according to claim 4,
wherein the first connecting part, the second connecting part, and the third connecting part are provided so as to overlap one another in a side view from the right and left direction.

6. The back door structure of the vehicle according to claim 4,
wherein the first connecting part includes a connecting wall part connecting between the outer panel and the inner panel in a front and rear direction, and
the connecting wall part has beads formed so as to extend in the front and rear direction.

7. The back door structure of the vehicle according to claim 4,
wherein the first connecting part is integrally formed with the horizontal frame part,
the second connecting part is integrally formed with the first vertical frame part, and
the third connecting part is integrally formed with the second vertical frame part.

8. The back door structure of the vehicle according to claim 4,
wherein the first connecting part connects only one end part on a first opening part's side in the width direction of the horizontal frame part to the outer panel,
the second connecting part connects only one end part on a third opening part's side in the width direction of the first vertical frame part to the outer panel, and
the third connecting part connects only one end part on the fourth opening part in the width direction of the second vertical frame part to the outer panel.

9. The back door structure of the vehicle according to claim 2,
wherein, on a condition the first vertical frame part is separated into a first upper part and a first lower part by setting the first merging part as a boundary, the first upper part is formed so that an angle made by the first upper part with an axis line extending along the up and down direction of the back door is larger than an angle made by the first lower part positioned at a lower part than the first merging part, and
under a condition the second vertical frame part is separated into a second upper part and a second lower part by setting the second merging part as a boundary, the second upper part is formed so that an angle made by the second upper part with an axis line extending in the up and down direction of the back door is larger than an angle made by the second lower part positioned at a lower part than the second merging part.

10. The back door structure of the vehicle according to claim 1,
wherein each of the first merging part and the second merging part has an approximately triangular shape in front view.

11. The back door structure of the vehicle according to claim 1,
wherein the connecting parts include a first connecting part connecting only one end part in the width direction of the horizontal frame part to the outer panel, a second connecting part connecting only one end part in the width direction of the first vertical frame part to the outer panel, and a third connecting part connecting only one end part in the width direction of the second vertical frame part to the outer panel.

12. The back door structure of the vehicle according to claim 11,
wherein the first connecting part, the second connecting part, and the third connecting part are provided so as to overlap one another in a side view from the right and left direction.

13. The back door structure of the vehicle according to claim 11,
wherein the first connecting part includes a connecting wall part connecting between the outer panel and the inner panel in a front and rear direction, and
the connecting wall part has beads formed so as to extend in the front and rear direction.

14. The back door structure of the vehicle according to claim 11,
wherein the first connecting part is integrally formed with the horizontal frame part,
the second connecting part is integrally formed with the first vertical frame part, and
the third connecting part is integrally formed with the second vertical frame part.

15. The back door structure of the vehicle according to claim 11,
wherein the first connecting part connects only one end part on a first opening part's side in the width direction of the horizontal frame part to the outer panel,
the second connecting part connects only one end part on a third opening part's side in the width direction of the first vertical frame part to the outer panel, and
the third connecting part connects only one end part on the fourth opening part in the width direction of the second vertical frame part to the outer panel.

16. The back door structure of the vehicle according to claim 1,
wherein, on a condition the first vertical frame part is separated into a first upper part and a first lower part by setting the first merging part as a boundary, the first upper part is formed so that an angle made by the first upper part with an axis line extending along the up and down direction of the back door is larger than an angle made by the first lower part positioned at a lower part than the first merging part, and
under a condition the second vertical frame part is separated into a second upper part and a second lower part by setting the second merging part as a boundary, the second upper part is formed so that an angle made by the second upper part with an axis line extending in the up and down direction of the back door is larger than an angle made by the second lower part positioned at a lower part than the second merging part.

* * * * *